US012568309B2

(12) United States Patent
Tamaki

(10) Patent No.: US 12,568,309 B2
(45) Date of Patent: Mar. 3, 2026

(54) FOCUS ADJUSTMENT APPARATUS AND METHOD, ELECTRONIC DEVICE, AND STORAGE MEDIUM

(71) Applicant: CANON KABUSHIKI KAISHA, Tokyo (JP)

(72) Inventor: Yoshihito Tamaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 18/794,294

(22) Filed: Aug. 5, 2024

(65) Prior Publication Data

US 2025/0056117 A1 Feb. 13, 2025

(30) Foreign Application Priority Data

Aug. 8, 2023 (JP) ................................. 2023-129512

(51) Int. Cl.
*H04N 23/67* (2023.01)
*H04N 23/61* (2023.01)
*H04N 23/667* (2023.01)

(52) U.S. Cl.
CPC ............. *H04N 23/67* (2023.01); *H04N 23/61* (2023.01); *H04N 23/667* (2023.01)

(58) Field of Classification Search
CPC .... H04N 23/675; H04N 23/635; H04N 23/61; H04N 23/67; H04N 23/667; H04N 23/673
USPC ...................................................... 348/222.1
See application file for complete search history.

(56) References Cited

U.S. PATENT DOCUMENTS

| | | | | |
|---|---|---|---|---|
| 8,363,153 B2 * | 1/2013 | Tsukada | ................... | G02B 7/36 |
| | | | | 348/349 |
| 9,264,666 B1 * | 2/2016 | Edelhaus | ................ | H04L 65/70 |
| 9,338,343 B2 | 5/2016 | Sasaki | | |
| 9,565,353 B2 * | 2/2017 | Nishigori | ............... | H04N 23/61 |
| 9,781,344 B2 * | 10/2017 | Ishihara | ............... | H04N 23/673 |
| 12,069,234 B2 * | 8/2024 | Oigawa | ................. | G01S 7/4865 |
| 2014/0176786 A1 * | 6/2014 | Iwasaki | ................ | H04N 23/635 |
| | | | | 348/351 |
| 2014/0300800 A1 * | 10/2014 | Sasaki | .................. | H04N 23/673 |
| | | | | 348/347 |
| 2015/0077621 A1 * | 3/2015 | Nishigori | ............... | H04N 23/67 |
| | | | | 348/349 |
| 2015/0092091 A1 * | 4/2015 | Ishihara | ............... | H04N 25/674 |
| | | | | 348/222.1 |

(Continued)

FOREIGN PATENT DOCUMENTS

JP 2014-202922 A 10/2014

*Primary Examiner* — Pritham D Prabhakher
(74) *Attorney, Agent, or Firm* — Venable LLP

(57) ABSTRACT

A focus detection unit detects a focus state in one or more areas based on image data, a subject detection unit detects a subject from an image of the image data and outputs subject information, a determination unit determines whether or not one or more predetermined conditions are satisfied based on at least one of shooting setting information and the subject information, and determines whether or not to perform adjustment processing for correcting an effect of field curvature on the focus state. An adjustment unit adjusts the focus state if the adjustment processing is to be performed, and a calculation unit calculates a movement amount of a focus lens based on the focus state adjusted by the adjustment unit, or on the focus state detected by the focus detection unit in a case where the focus state is not adjusted.

14 Claims, 6 Drawing Sheets

(56)                    References Cited

U.S. PATENT DOCUMENTS

| | | | |
|---|---|---|---|
| 2016/0127648 A1* | 5/2016 | Ishihara ............... | H04N 25/611 |
| | | | 348/208.6 |
| 2019/0128669 A1* | 5/2019 | Nobayashi ............. | G01C 3/085 |
| 2022/0321871 A1* | 10/2022 | Oigawa ................ | G01S 7/4814 |

* cited by examiner

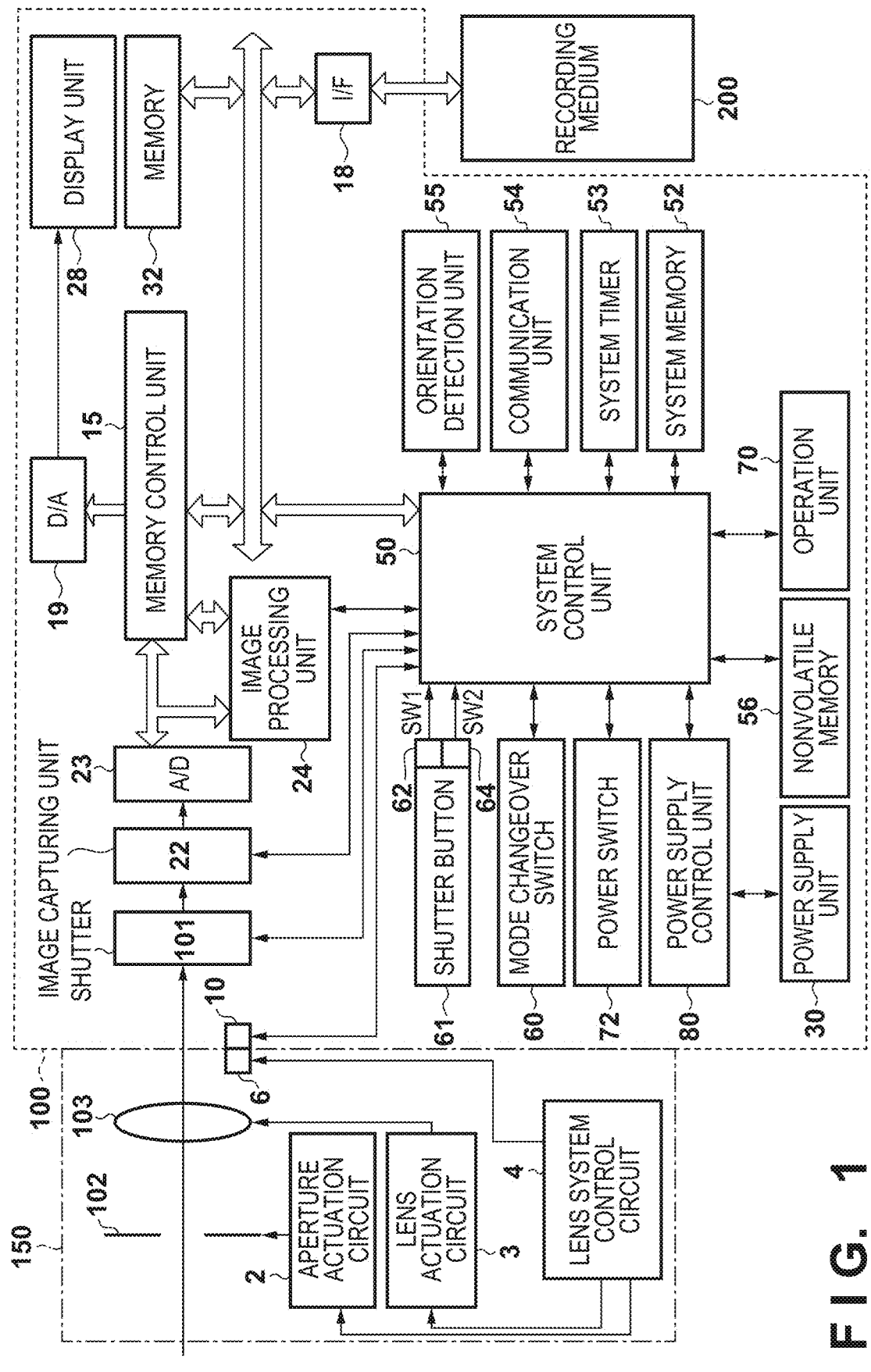
F I G. 1

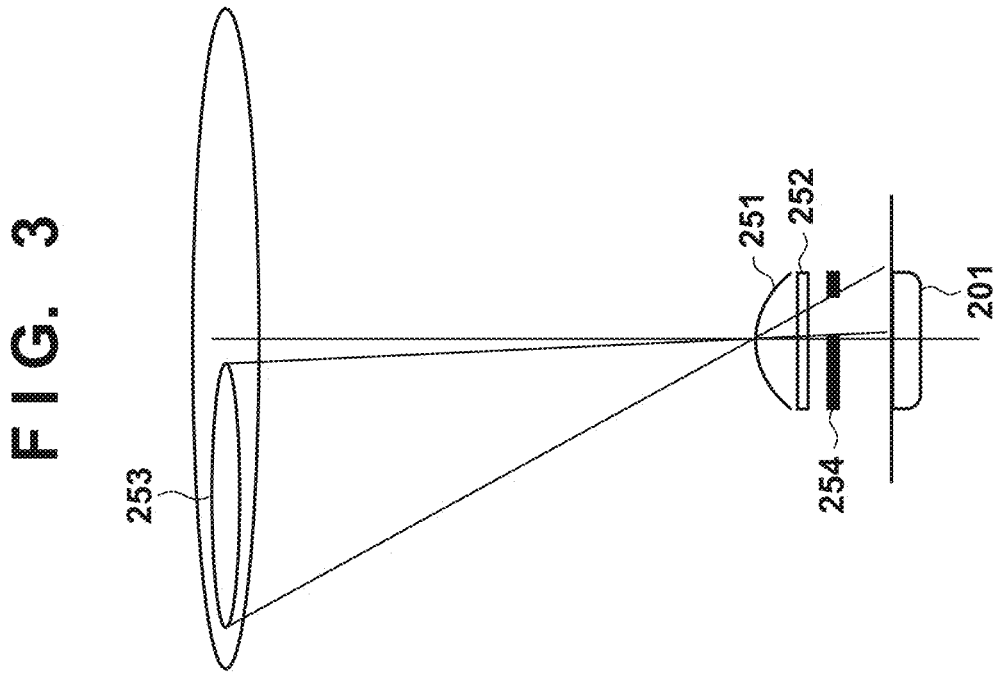
F I G.  3
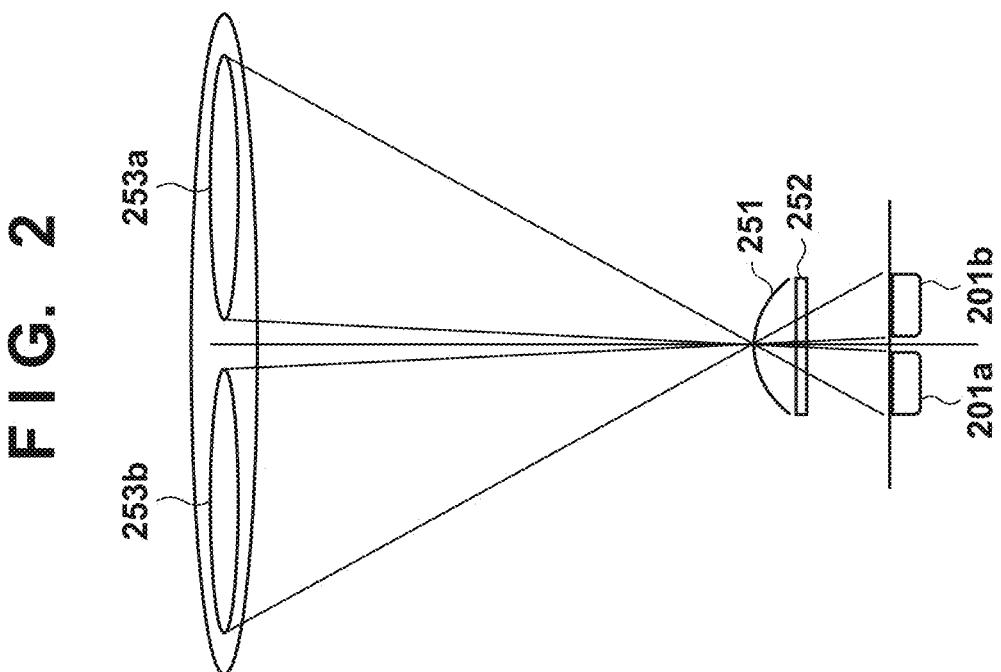
F I G.  2

FIG. 4

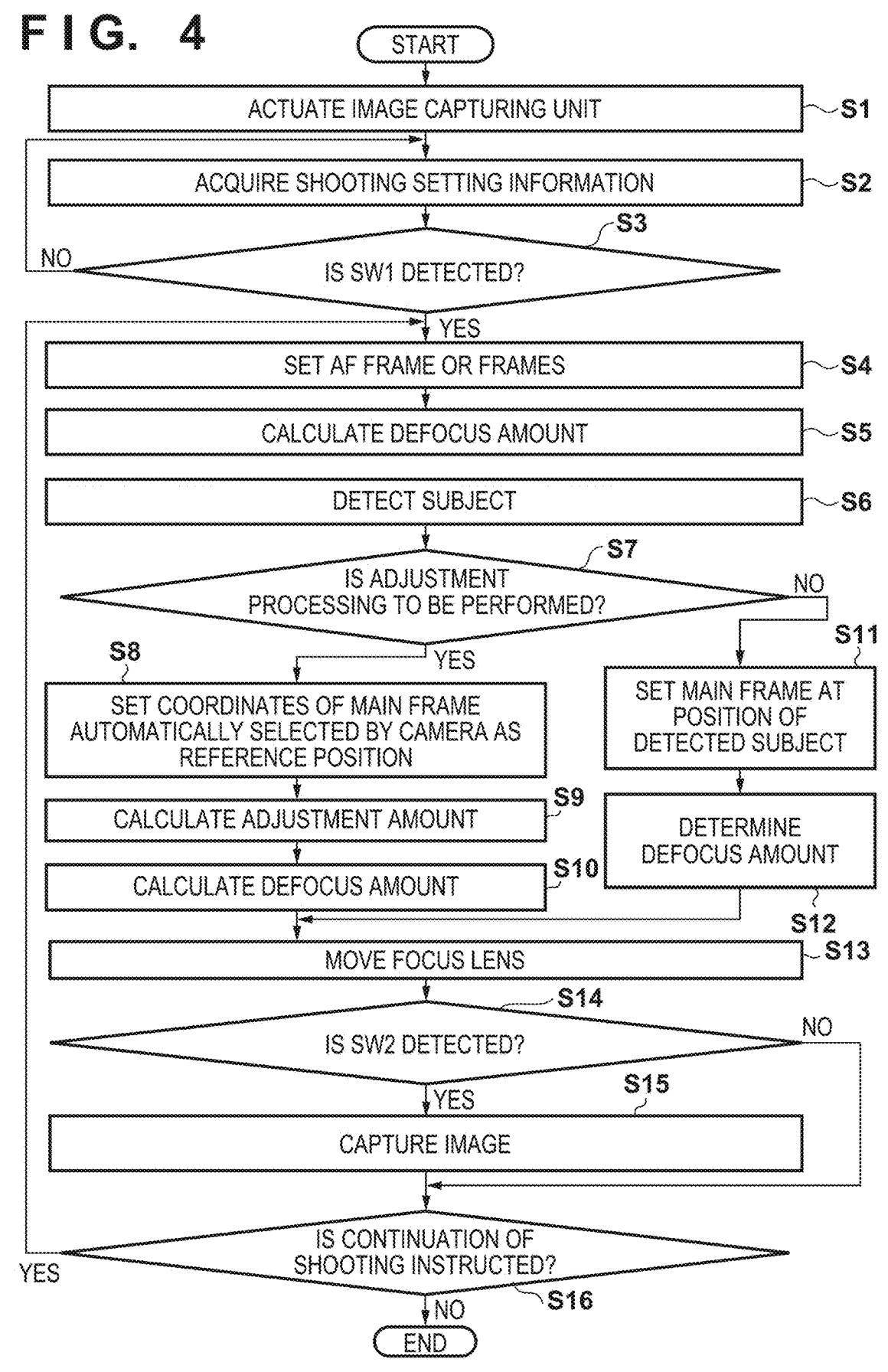

START

ACTUATE IMAGE CAPTURING UNIT ～S1

ACQUIRE SHOOTING SETTING INFORMATION ～S2

S3
IS SW1 DETECTED? — NO

YES

SET AF FRAME OR FRAMES ～S4

CALCULATE DEFOCUS AMOUNT ～S5

DETECT SUBJECT ～S6

S7
IS ADJUSTMENT PROCESSING TO BE PERFORMED? — NO

YES

S8
SET COORDINATES OF MAIN FRAME AUTOMATICALLY SELECTED BY CAMERA AS REFERENCE POSITION

S11
SET MAIN FRAME AT POSITION OF DETECTED SUBJECT

CALCULATE ADJUSTMENT AMOUNT S9

DETERMINE DEFOCUS AMOUNT

CALCULATE DEFOCUS AMOUNT S10

S12

MOVE FOCUS LENS ～S13

S14
IS SW2 DETECTED? — NO

YES S15

CAPTURE IMAGE

IS CONTINUATION OF SHOOTING INSTRUCTED?

YES

NO S16

END

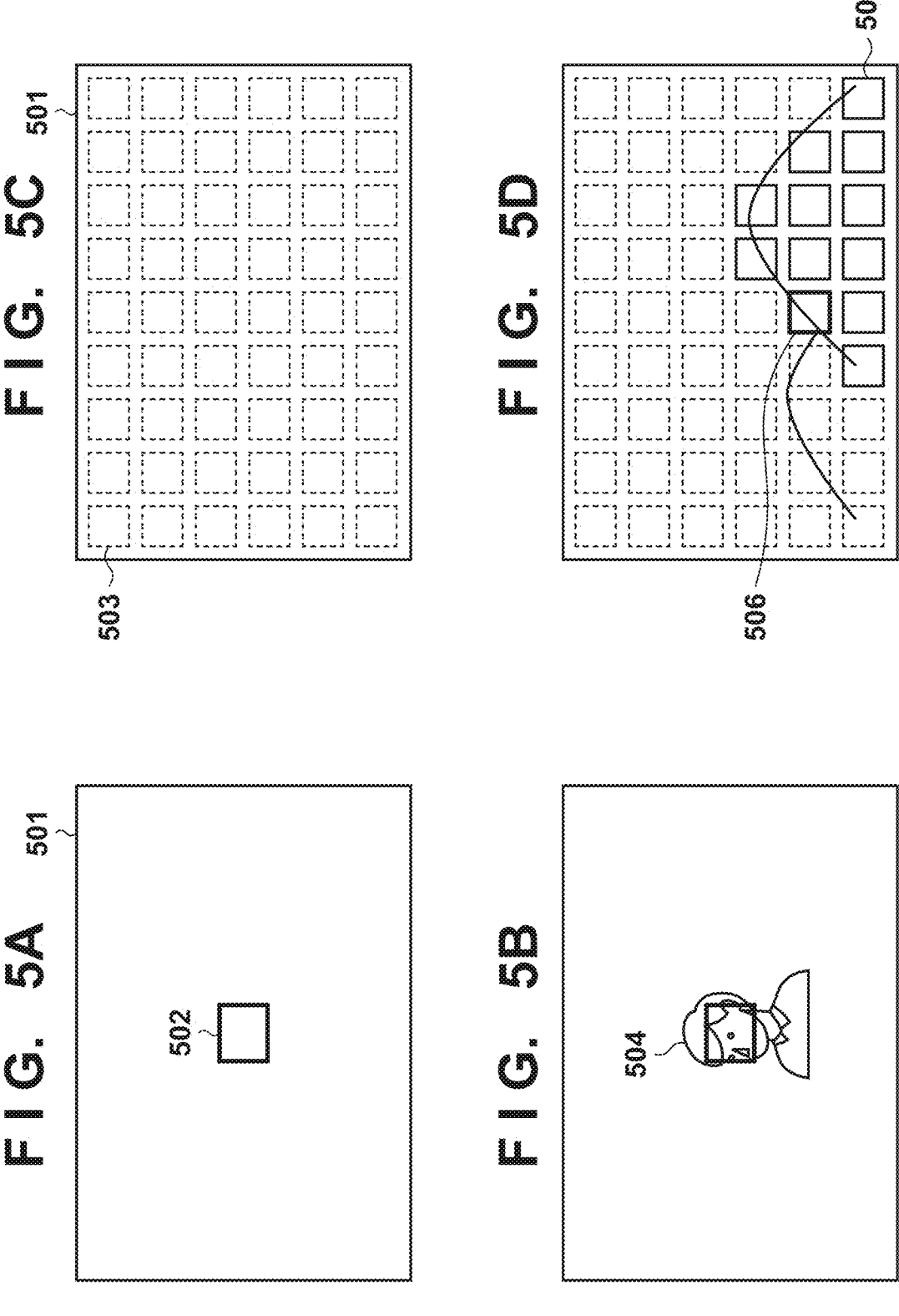

F I G. 7A
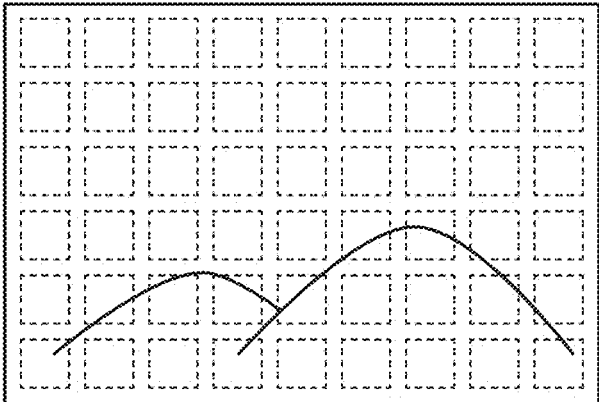
F I G. 7B
701
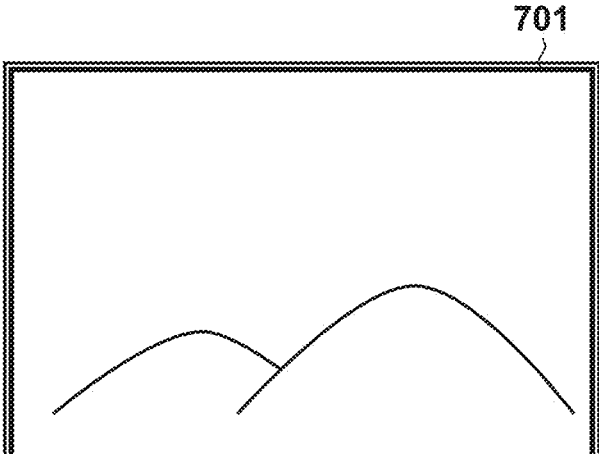

FOCUS ADJUSTMENT APPARATUS AND METHOD, ELECTRONIC DEVICE, AND STORAGE MEDIUM

BACKGROUND OF THE INVENTION

Field of the Invention

The present invention relates to a focus adjustment apparatus, a method, an electronic device equipped with a focus adjustment apparatus, and a storage medium.

Description of the Related Art

In recent years, with the pursuit of smaller and thinner digital cameras and higher magnification of zoom lenses, it has become increasingly difficult to suppress residual aberrations in imaging lenses. In general, in an imaging optical system, when shooting conditions such as the distance to the subject change, aberrations fluctuate and the performance changes, so an imaging optical system is usually designed so as to keep the aberrations within a predetermined range. For example, among aberrations, field curvature varies depending on the shooting distance.

Japanese Patent Laid-Open No. 2014-202922 discloses a technique that, in consideration of the designed amount of field curvature, error components due to field curvature according to the position of the image plane are removed from distance information of each subject, and based on the obtained distance information, the focus is adjusted so that the error in the defocus amount is minimized over the entire shooting screen. This controls the entire screen to be in focus.

However, in the conventional technology disclosed in Japanese Patent Laid-open No. 2014-202922, it is necessary to determine the arrangement state of a plurality of subjects based on the distance to and the position on the screen of each subject, however, there is a problem in that it is difficult to detect a subject when shooting a landscape or the like where a specific subject does not exist. Additionally, if a photographer sets a focus detection frame at a single arbitrary point, it is required that the subject within the focus detection frame set at the arbitrary point should be brought into focus instead of pan-focusing on the entire screen. However, in Japanese Patent Laid-open No. 2014-202922, only the state of the subject is used in a method for removing the influence of field curvature from the distance information of the subject, and therefore, there is a problem in that the photographer's intention is not taken into consideration from the camera settings, etc., and the above-mentioned demand of the photographer cannot be satisfied.

SUMMARY OF THE INVENTION

The present invention has been made in consideration of the above situation, and is to perform the focus adjustment in accordance with the photographer's intention, while taking the influence of field curvature into account.

According to the present invention, provided is a focus adjustment apparatus comprising one or more processors and/or circuitry which function as: a focus detection unit that detects a focus state in one or more areas based on image data obtained from an image shooing unit; a subject detection unit that detects a subject from an image of the image data and outputs subject information; a determination unit that determines whether or not one or more predetermined conditions are satisfied based on at least one of shooting setting information set by a user and the subject information, and determines whether or not to perform adjustment processing for correcting an effect of field curvature on the focus state; an adjustment unit that adjusts the focus state detected by the focus detection unit in a case where the determination unit determines that the adjustment processing is to be performed; and a calculation unit that calculates a movement amount of a focus lens based on the focus state adjusted by the adjustment unit, or on the focus state detected by the focus detection unit in a case where the focus state is not adjusted by the adjustment unit.

Further, according to the present invention, provided is an electronic device comprising: an image shooting unit; and a focus adjustment apparatus comprising one or more processors and/or circuitry which function as: a focus detection unit that detects a focus state in one or more areas based on image data obtained from an image shooing unit; a subject detection unit that detects a subject from an image of the image data and outputs subject information; a determination unit that determines whether or not one or more predetermined conditions are satisfied based on at least one of shooting setting information set by a user and the subject information, and determines whether or not to perform adjustment processing for correcting an effect of field curvature on the focus state; an adjustment unit that adjusts the focus state detected by the focus detection unit in a case where the determination unit determines that the adjustment processing is to be performed; and a calculation unit that calculates a movement amount of a focus lens based on the focus state adjusted by the adjustment unit, or on the focus state detected by the focus detection unit in a case where the focus state is not adjusted by the adjustment unit.

Furthermore, according to the present invention, provided is a focus adjustment method comprising: detecting a focus state in one or more areas based on image data obtained from an image shooing unit; detecting a subject from an image of the image data and outputting subject information; determining whether or not one or more predetermined conditions are satisfied based on at least one of shooting setting information set by a user and the subject information, and determining whether or not to perform adjustment processing for correcting an effect of field curvature on the focus state; adjusting the detected focus state in a case where it is determined that the adjustment processing is to be performed; and calculating a movement amount of a focus lens based on the adjusted focus state, or on the detected focus state in a case where the focus state is not adjusted.

Further, according to the present invention, provided is a non-transitory computer-readable storage medium, the storage medium storing a program that is executable by the computer, wherein the program includes program code for causing the computer to function as an focus adjustment apparatus comprising: a focus detection unit that detects a focus state in one or more areas based on image data obtained from an image shooing unit; a subject detection unit that detects a subject from an image of the image data and outputs subject information; a determination unit that determines whether or not one or more predetermined conditions are satisfied based on at least one of shooting setting information set by a user and the subject information, and determines whether or not to perform adjustment processing for correcting an effect of field curvature on the focus state; an adjustment unit that adjusts the focus state detected by the focus detection unit in a case where the determination unit determines that the adjustment processing is to be performed; and a calculation unit that calculates a movement amount of a focus lens based on the focus state adjusted by the adjustment unit, or on the focus state detected by the focus detection unit in a case where the focus state is not adjusted by the adjustment unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram illustrating a configuration of an image capturing apparatus according to an embodiment of the present invention.

FIG. 2 is a diagram illustrating the configuration of a pixel and the correspondence between an exit pupil of an optical system and photoelectric conversion units of the pixel according to the embodiment.

FIG. 3 is a diagram illustrating another configuration of a pixel and the correspondence between an exit pupil of an optical system and an aperture of the pixel according to the embodiment.

FIG. 4 is a flowchart illustrating a flow of shooting processing according to the embodiment.

FIGS. 5A to 5D are diagrams illustrating focus detection areas according to the embodiment.

FIGS. 7A and 7B are diagrams illustrating an example of a method for displaying a focus state according to the embodiment.

DESCRIPTION OF THE EMBODIMENTS

Figure 6C:
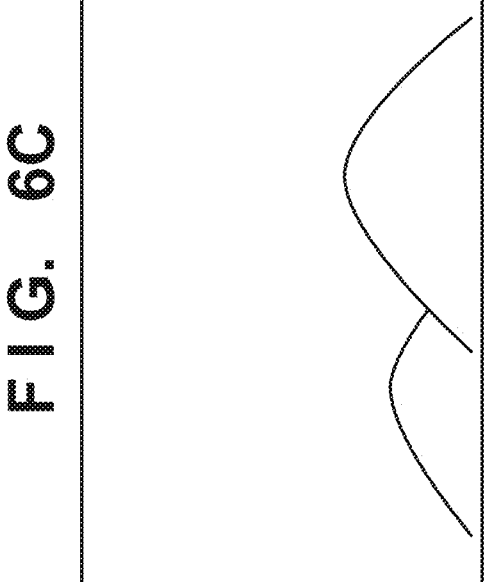
FIGS. 6A to 6C are diagrams showing examples of detected subjects and subject detection frames according to the embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

[Configuration of Image Capturing Apparatus]

FIG. 1 is a block diagram showing a configuration of an image capturing apparatus according to an embodiment of the present invention. In the following description, a case will be explained in which the image capturing apparatus is a single-lens reflex type digital camera with an interchangeable lens, but the present invention is also applicable to digital cameras and video cameras whose lenses cannot be changed. Furthermore, the present invention is applicable to any electronic device equipped with a camera, such as a mobile phone, personal computer (laptop, tablet, etc.), game console, etc., or a camera system comprising a camera and a control apparatus that can remotely control the camera.

In FIG. 1, a lens unit 150 is a lens unit equipped with a photographic lens, and is configured to be detachably attached to a camera body 100, and includes an aperture 102, lens 103, an aperture actuation circuit 2, a lens actuation circuit 3, a lens system control circuit 4, and a communication terminal 6. The lens 103 is usually composed of a plurality of lenses including a focus lens, a zoom lens, etc., but is simply shown as one lens here.

The lens system control circuit 4 communicates with a system control unit 50 via the communication terminal 6 and a communication terminal 10 of the camera body 100. The lens system control circuit 4 controls the aperture 102 via the aperture actuation circuit 2 based on instructions from the system control unit 50, and also moves the position of the focus lens included in the lens 103 via the lens actuation circuit 3 to focus. At this time, the focus lens is controlled by the system control unit 50 using a focus detection result obtained by a focus detection method in this embodiment, which will be described later.

Further, in the camera body 100, a shutter 101 is a focal plane shutter that can control an exposure period of an image capturing unit 22 under control of the system control unit 50.

The image capturing unit 22 is an image sensor composed of a CCD, a CMOS element, etc., which converts an optical image incident through the lens unit 150 into an electrical signal. Note that the detailed configuration of the image capturing unit 22 will be described later with reference to FIG. 2, and a plurality of pixels each having a plurality of photoelectric conversion units with respect to one microlens are arranged. With this configuration, the entrance pupil of the lens 103 is divided, so that signals for focus detection having a phase difference (hereinafter referred to as "focus detection signals") can be obtained from the photoelectric conversion units of each pixel. Furthermore, an image signal can also be obtained by adding the focus detection signals from the plurality of photoelectric conversion units for each pixel. The focus detection signals and image signal obtained in this way can be used not only as an image but also for exposure control and focus adjustment control.

An A/D converter 23 converts an analog signal output from the image capturing unit 22 into a digital signal.

An image processing unit 24 performs resizing processing such as predetermined pixel interpolation and reduction, and color conversion processing on the digital signal output from the A/D converter 23 or the image data read out from a memory control unit 15. In addition, the image processing unit 24 performs predetermined calculation processing using the image data (focus detection signals and image signal) obtained by shooting, and the system control unit 50 performs exposure control and focus adjustment control based on the obtained calculation result. As a result, through-the-lens (TTL) based autofocus (AF) processing, automatic exposure (AE) processing, and flash pre-emission (EF) processing are performed. The image processing unit 24 further performs predetermined calculation processing using the image data obtained by shooting, and also performs TTL-based auto white balance (AWB) processing based on the obtained calculation result.

Data output from the A/D converter 23 is written to a memory 32 via the image processing unit 24 and the memory control unit 15, or directly via the memory control unit 15. The memory 32 stores image data obtained by the image capturing unit 22 and converted into a digital signal by the A/D converter 23, and image data to be displayed on a display unit 28.

The memory 32 has a storage capacity sufficient to store a predetermined number of still images, moving images and audio for a predetermined period of time.

Additionally, the memory 32 also serves as image display memory (video memory). A D/A converter 19 converts the image data for display stored in the memory 32 into an analog signal and supplies it to the display unit 28. In this way, the image data for display written to the memory 32 is displayed on the display unit 28 via the D/A converter 19. The display unit 28 performs display according to the analog signal from the D/A converter 19 on a display such as an LCD. In this way, the digital signal that has been A/D converted by the A/D converter 23 and stored in the memory 32 is converted into an analog signal by the D/A converter 19, and is sequentially transferred to the display unit 28 for display, thereby a function of an electronic viewfinder is realized and through images (live view display) are displayed. Note that the display unit 28 may be provided as an electronic viewfinder viewed through an eyepiece (not shown), or may be provided as a display provided on the back of the camera body 100. Additionally, both an electronic viewfinder and a rear display may be provided.

A nonvolatile memory 56 is an electrically erasable/recordable memory, such as an EEPROM. The nonvolatile memory 56 stores constants, programs, etc. for the operation of the system control unit 50. The program here refers to a program for executing various flowcharts described later in this embodiment.

The system control unit 50 controls the entire image capturing apparatus. Further, each process of this embodiment, which will be described later, is performed under the control of the system control unit 50. At that time, the system control unit 50 executes the program stored in the nonvolatile memory 56 to realize each process of the present embodiment, which will be described later.

A RAM is used as a system memory 52, and stores constants and variables for the operation of the system control unit 50, programs read from the nonvolatile memory 56, and so forth. The system control unit 50 also performs display control by controlling the memory 32, D/A converter 19, display unit 28, and the like.

A system timer 53 is a timer that measures the time used for various controls and the time of a built-in clock.

A power switch 72 is an operation member that switches the power of the camera body 100 on and off.

A mode changeover switch 60, a shutter button 61, and an operation unit 70 are operation members for inputting various operation instructions to the system control unit 50. The mode changeover switch 60 switches the operation mode of the system control unit 50 to one of a still image recording mode, a moving image shooting mode, a playback mode, and the like. Modes included in the still image recording mode include, for example, automatic shooting mode, automatic scene discrimination mode, manual mode, aperture priority mode (Av mode), shutter speed priority mode (Tv mode), various scene modes in which shooting settings are independently set for each shooting scene, program AE mode, custom mode, etc. The mode changeover switch 60 allows direct switching to any of these modes included in the menu button. Alternatively, after once switching to a menu button with the mode changeover switch 60, any of these modes included in the menu button may be selected using another operation member. Similarly, the moving image shooting mode may also include a plurality of modes.

A first shutter switch 62 is turned on when the shutter button 61 is pressed halfway (shooting preparation instruction) during operation of the shutter button 61, and a first shutter switch signal SW1 is generated. As the first shutter switch signal SW1 is generated, operations such as autofocus (AF) processing, auto exposure (AE) processing, auto white balance (AWB) processing, and flash pre-emission (EF) processing are started.

A second shutter switch 64 is turned ON when the shutter button 61 is fully pressed (photographing instruction), and a second shutter switch signal SW2 is generated. The system control unit 50 starts a series of shooting operations from reading signals from the image capturing unit 22 to writing image data to the recording medium 200 in response to the second shutter switch signal SW2.

The operation unit 70 includes various operation members serving as input units that receive operations by the user. The operation unit 70 is provided with buttons, a cross key, a touch panel, etc. for performing menu selection, mode selection, instruction to playback captured moving images, and the like.

Each operation member of the operation unit 70 is assigned an appropriate function for each scene by selecting and operating various function icons displayed on the display unit 28, and acts as various function buttons. Examples of the function buttons include an end button, a return button, a next image button, a jump button, a narrowing down button, and an attribute change button. For example, when a menu button is pressed, various configurable menu screens are displayed on the display unit 28. A user can intuitively make various settings using the menu screen displayed on the display unit 28, four-way buttons (up, down, left, right), and the SET button. Further, by arranging a touch panel on the display unit 28, various settings can be made by touching various display contents on the display unit 28.

A power supply control unit 80 includes a battery detection circuit, a DC-DC converter, a switch circuit for switching the block to be energized, and the like, and detects whether or not a battery is attached, the type of the battery, and the remaining battery level. Further, the power supply control unit 80 controls the DC-DC converter based on the detection result and the instructions from the system control unit 50, and supplies the necessary voltage to each section including a recording medium 200 for a necessary period.

A power supply unit 30 includes primary batteries such as alkaline batteries and lithium batteries, secondary batteries such as NiCd batteries, NiMH batteries, and Li batteries, an AC adapter, and the like.

A recording medium I/F 18 is an interface with the recording medium 200 such as a memory card or hard disk. The recording medium 200 is a recording medium for recording shot images, and is composed of a semiconductor memory such as a memory card, a magnetic disk, and the like.

A communication unit 54 is to make connection with external devices wirelessly or via a priority cable, and transmits and receives video signals and audio signals. The communication unit 54 can also be connected to a wireless Local Area Network (LAN) and the Internet. The communication unit 54 can transmit images captured by the image capturing unit 22 (including through images) and images recorded in the recording medium 200, and can also receive image data and other various information from external devices.

An orientation detection unit 55 detects the orientation of the camera body 100 with respect to the direction of gravity. Based on the orientation detected by the orientation detection unit 55, it is possible to determine whether the image taken by the image capturing unit 22 is an image taken with the camera body 100 held horizontally or an image taken with the camera body 100 held vertically. The system control unit 50 can add orientation information according to the orientation detected by the orientation detection unit 55 to the image file of the image captured by the image capturing unit 22, or can rotate and record the image. As the orientation detection unit 55, an acceleration sensor, a gyro sensor, or the like may be used.

The above-mentioned camera body 100 is capable performing shooting using AF method settings such as "arbitrary single point AF" that performs AF on one arbitrary area within the shooting screen and "multi-point/zone AF" that performs AF on an arbitrarily point selected from multiple points/zones within the shooting screen.

In addition, in the above-described camera body 100, it is possible to perform processing for shooting in a focused state according to the photographer's intention by taking into account subject information, shooting setting information, and field curvature, which will be described later.

[Explanation of Focus Detection Processing]

FIG. 2 is a diagram showing the configuration of a pixel according to this embodiment and the correspondence between the exit pupil of the optical system and the photoelectric conversion units of the pixel. Each pixel is provided with a microlens 251, a color filter 252, and two photoelectric conversion units, i.e., a photoelectric conversion unit 201*a* and a photoelectric conversion unit 201*b*. The light that has passed through a partial area 253*a* of the exit pupil enters the photoelectric conversion unit 201*a* through the microlens 251 and the color filter 252, and the light that has passed through a partial area 253*b* of the exit pupil enters the photoelectric conversion unit 201*b* through the microlens 251 and the color filter 252. With this configuration, it is possible to perform focus detection using the so-called on-imaging plane phase difference method (hereinafter referred to as "on-imaging plane phase difference AF") using the signals obtained from the photoelectric conversion unit 201*a* and the photoelectric conversion unit 201*b*. Furthermore, an image signal can be generated by adding the signals obtained from the photoelectric conversion unit 201*a* and the photoelectric conversion unit 201*b* for each pixel.

In this embodiment, by arranging the pixels having the structure shown in FIG. 2 in the entire screen area of the image capturing unit 22, it is possible to detect the focus state of an image of any subject formed on the light incident surface of the image capturing unit 22 using the on-imaging plane phase difference AF.

FIG. 3 is a diagram showing another configuration of a pixel according to the present embodiment and the correspondence between the exit pupil of the optical system and an aperture of the pixel. The pixel shown in FIG. 3 is a pixel dedicated to focus detection, unlike the pixel shown in FIG. 2. Each pixel is provided with a microlens 251, a color filter 252, a mask 254 with an aperture, and a photoelectric conversion unit 201. The shape of the exit pupil 253 is determined by the mask 254. The light that has passed through the exit pupil 253 enters the photoelectric conversion unit 201 via the microlens 251, the color filter 252, and the mask 254. Since a pixel having this structure photoelectrically converts only the light that has passed through the exit pupil 253, a pixel to form a pair, that is, a pixel in which an aperture of the mask 254 of the pixel shown in FIG. 3 is formed on the left side should be provided to obtain a pair of focus detection signals. By providing the pixels shown in FIG. 3 and their paired pixels discretely among the pixels (imaging pixels) that do not have the mask 254, it is possible to detect the focus state of an image of any subject formed on the light incident surface of the image capturing unit 22 using the on-imaging plane phase difference AF.

Next, the on-imaging plane phase difference AF will be explained. Here, a case where each pixel forming the image capturing unit 22 has the structure shown in FIG. 2 will be described.

An AF image A, which is a collection of focus detection signal output from the photoelectric conversion unit 201*a* of each pixel, and the AF B image, which is a collection of focus detection signal output from the photoelectric conversion unit 201*b* of each pixel, undergo following processing using a known phase difference calculation method or the like.

First, a correlation amount between the AF A image and the AF B image, which are the focus detection signals of this embodiment, is calculated. While relatively shifting the positions of the AF A image and AF B image by a shift amount stored in the nonvolatile memory 56, the correlation amount is calculated at each position. The correlation amount COR(k) is calculated by the following equation (1).

$$COR(k) = \sum_{i=1}^{N-1-2 \times kmax} |A(m, i-k) - B(m, i+k)| \qquad (1)$$

$$\text{where } (-kmax \le k \le kmax)$$

k in the equation (1) is a relative shift amount between the AF A image and the AF B image during phase difference calculation, and is an integer greater than or equal to −kmax and equal to or less than kmax. Then, the value of k that is closest to the phase difference between the AF A image and the AF B image, that is, the value of k that minimizes the correlation amount COR(k) is determined. Here, if the value of k is calculated as an integer, the resolution will become rough, so interpolation processing is performed as appropriate to perform so-called sub-pixel calculation.

In this embodiment, the difference DCOR between the correlation amount COR(k) and the correlation amount COR(k−1) is taken, and the shift amount dk at which the sign of the difference changes is detected. Note that the difference DCOR is calculated by the following equation (2).

$$DCOR(k) = COR(k) - COR(k-1) \qquad (2)$$

Using this difference DCOR, a shift amount dk at which the sign of the difference changes is detected. The shift amount dk at which the sign of the difference changes is the phase difference. Assuming that the value of k immediately before the sign changes is k1, and the value of k immediately after the sign changes is k2 (k2=k1+1), the shift amount dk is calculated by the following equation (3).

$$dk = k1 + |DCOR(k1)|/|DCOR(k1) - DCOR(k2)| \qquad (3)$$

As described above, the shift amount dk of the AF A image and AF B image of one pixel or less is calculated, and the process is completed.

Note that there are various known methods for calculating the phase difference, and other methods may be used.

Then, a defocus amount Def is calculated from the obtained phase difference. By multiplying the calculated phase difference by the sensitivity stored in the nonvolatile memory 56 in advance, the phase difference is converted into a defocus amount Def.

Note that in this embodiment, on-imaging plane phase difference AF is described as a focus detection method, but the focus detection method in the present invention is not limited to the on-imaging plane phase difference method. For example, the image capturing unit 22 may not be provided with focus detection pixels shown in FIG. 2 or FIG. 3, and only imaging pixels may be provided, and the obtained signal may be used to perform focus detection by known so-called contrast method (hereinafter referred to as "contrast AF").

Contrast AF is a method that extracts a specific frequency component of an image signal (so-called band-pass filter processing), performs contrast evaluation, and performs focus detection. Unlike the on-imaging plane phase difference AF, focus detection is performed using contrast evaluation values of a plurality of frames.

[Image Processing]

Next, the shooting processing in the first embodiment will be explained with reference to a flowchart of FIG. 4. Note that the processing shown in FIG. 4 is realized mainly by the system control unit 50.

First, in step S1, under the control of the system control unit 50, actuation of the image capturing unit 22 is started and image data is acquired. Note that the image data acquired in step S1 is not for recording, different from image data for recording which will be described later, but for detecting various information and displaying images, so an image smaller in size than an image to be recorded is acquired. For example, an image having sufficient resolution for focus detection, subject detection, or live view display is acquired. Here, it is assumed that a moving image for live view display is to be shot, and as an actuation operation thereof, shooting accompanied by charge accumulation and readout operation is performed according to the frame rate of live view display using a so-called electronic shutter. The live view display performed here is for the photographer to check the shooting range and shooting conditions, and is generally displayed at 30 frames/second (shooting interval 33.3 ms) or 60 frames/second (shooting interval 16.6 ms). However, the frame rate is not limited to these. After starting to actuate the image capturing unit 22, the process moves to step S2.

In step S2, shooting setting information of the camera body 100 is acquired. The shooting setting information includes AF method information, AF operation information, and image shooting operation information in addition to exposure setting values, lens aperture value, and the like. The AF method information includes an arbitrary one-point AF mode, which is the arbitrary area setting method of this embodiment, and a multi-point/zone AF mode. Further, the AF operation information includes a one-shot AF mode in which focus adjustment is performed once, a continuous focus adjustment mode, and a servo AF mode in which continuous shooting is performed while keeping the subject in focus. The shooting operation information includes a single shooting mode in which one shooting is performed, and a continuous shooting mode in which multiple shootings are performed consecutively. After acquiring the shooting setting information, the process moves to step S3.

In step S3, it is detected whether or not the first shutter switch signal SW1 is generated as the first shutter switch 62 is turned on by a so-called half-stroke of the shutter button 61 provided on the camera body 100 during operation of the shutter button 61 (shooting preparation instruction). If the first shutter switch signal SW1 is detected, the process moves to step S4 to perform focus detection processing according to this embodiment and focus adjustment processing. If the first shutter switch signal SW1 is not detected, the process returns to step S2 to obtain the latest shooting setting information while maintaining the shooting standby state.

In step S4, among the shooting setting information acquired in step S2, it is determined whether the AF mode is the arbitrary single point AF mode or the multi-point/zone AF mode from the AF method information, and the focus detection area (AF frame) is set according to the determined mode. The arbitrary single point AF mode is a mode in which the AF frame is set at one location, and is used when the photographer has clearly specified the subject that he or she wants to focus on in AF. On the other hand, in both multi-point AF mode and zone AF mode, the AF frames are set at multiple locations, but the zone AF mode is different from the multi-point AF mode in the point that the AF frames are set at multiple locations within a limited range. The multi-point/zone AF mode is different from the arbitrary single point AF mode, and is used, when the subject the photographer wants to focus on in AF is not clear, or when landscapes where the desired focus points are at approximately the same distance is shot, for example.

Here, the process of setting the AF frame or frames according to the AF method information, which is performed in step S4, will be explained using FIGS. 5A to 5D.

FIGS. 5A and 5B show an example of the arbitrary single point AF mode, and 501 in FIG. 5A represents a shooting screen, 502; an AF frame in the arbitrary single point AF mode, and 504 in FIG. 5B; a person as an example of a subject in the arbitrary single point AF mode.

FIGS. 5C and 5D illustrate an example in the multi-point/zone AF mode, where 501 in FIG. 5C indicates a shooting screen and the dotted rectangle 503 indicates a plurality of AF frames in the multi-point/zone AF mode. A solid rectangle 505 in FIG. 5D indicates a plurality of AF frames, among the plurality of AF frames 503 shown in FIG. 5C, selected by the system control unit 50 for which the defocus amount on the closest side is calculated. Furthermore, a thick-lined rectangle 506 indicates an AF frame for which the closest defocus amount has been calculated among the plurality of AF frames 505.

First, if the arbitrary single point AF mode, which is an AF method that allows the photographer to specify the subject to be focused on in an arbitrary area, is selected as the AF method information, as shown in FIG. 5A, the photographer sets the AF frame 502 in any one area. Note that although this embodiment shows an example in which the AF frame 502 is set at the center of the shooting screen, the AF frame may be set at a position other than the center, such as at a peripheral position of the shooting screen. Further, in a case where the person 504 is the specific subject of this embodiment as shown in FIG. 5B, the photographer performs framing such that the AF frame 502 overlaps with the face, etc. of the person 504.

On the other hand, if the multi-point/zone AF mode, which is an AF method in which the system control unit 50 sets the subject to focus on in place of the photographer is selected as the AF method information, as shown in FIG. 5C, the plurality of AF frames 503 are arranged over substantially the entire area of the shooting screen. Note that when shooting a landscape as shown in FIG. 5D, the photographer adjusts the angle of view to match the landscape to be shot. After setting the focus detection area as described above, the process moves to step S5.

In step S5, the defocus amount for each AF frame set in step S4 is calculated. That is, when the arbitrary single point AF mode is selected as the AF method information, the amount of defocus of the person 504 in FIG. 5B is calculated, for which framing is performed in consideration of the AF frame 502 set by the photographer. Further, from the calculated defocus amount, using optical information of the lens 103, subject distance information and depth of field information are calculated.

On the other hand, if the multi-point/zone AF mode is selected as the AF method information, the defocus amount is calculated for each of the plurality of AF frames 503 shown in FIG. 5C for the angle of view set by the photographer. Of the calculated defocus amounts of the plurality of AF frames 503, as shown in FIG. 5D, the display unit 28 displays the AF frames 505 that shows areas closer than a predetermined distance, and the AF frame 506 that shows the closest area (hereinafter referred to as the "main frame"). After the series of processing is completed, the process moves to step S6.

In step S6, a specific subject detection process is performed. As a method for detecting the subject, a known learning method using machine learning, recognition processing using image processing, or the like can be used. In learning methods using machine learning, the feature values of each part (face, eyes, whole body) of a subject (person, animal, etc.) are learned in advance, and the learned subject is recognized in the captured image, and information (position and size) of the area of the subject is recognized.

For example, types of machine learning include:

Support Vector Machine

Convolutional Neural Network

Recurrent Neural Network

Furthermore, as an example of recognition processing, a method is known in which a skin color area is extracted among the tone color of each pixel represented by image data, and a face is detected based on the degree of matching with a face contour plate prepared in advance. Furthermore, a method of detecting a face by extracting facial feature points such as eyes, nose, mouth, etc. using a well-known pattern recognition technique is also well-known. Note that the main area detection method applicable to this embodiment is not limited to these methods, and other methods such as a method using color, brightness value, contrast value, etc. may be used.

Then, the position and size of the detected subject on the screen are acquired. Note that in this embodiment, in the case of the multi-point/zone AF mode, there may be cases where no subject is detected. In such a case, detected subject is zero. After performing the subject detection processing as described above, the process moves to step S7.

In step S7, it is determined whether or not to perform defocus amount adjustment processing that takes into account the influence of field curvature on the focus state in order to capture an image in a focused state that matches the photographer's intentions based on the shooting setting information obtained in step S2, the defocus amount calculated in step S5, and the subject information obtained in step S6, while taking the field curvature into account.

Here, an example of conditions for performing the adjustment processing in consideration of the field curvature in this embodiment in step S7 will be described.

(1) In a case where it is determined from the subject information that no subject is detected (2) In a case where the multi-point/zone AF mode is determined from the AF method information (3) In a case where the one-shot AF mode is determined from the AF operation information (4) In a case where the single-shot mode is determined from the shooting operation information (5) In a case where the distance to the detected subject is determined to be greater than or equal to a predetermined distance threshold based on the subject information and defocus amount (6) In a case where it is determined from the subject information that the size of the detected subject is less than a predetermined size threshold (7) In a case where the depth of field is determined to be greater than or equal to the predetermined depth of field threshold based on the aperture value of the lens Condition (1)

First, the case of determining whether or not to perform the adjustment processing based on the subject information will be described using FIGS. 6A to 6C.

Figure 6A:
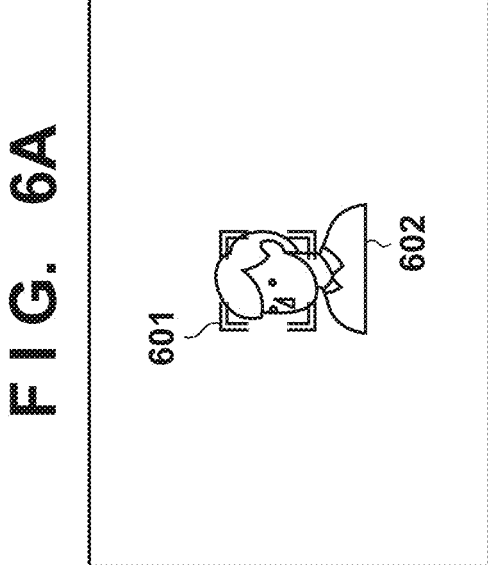
Figure 6B:
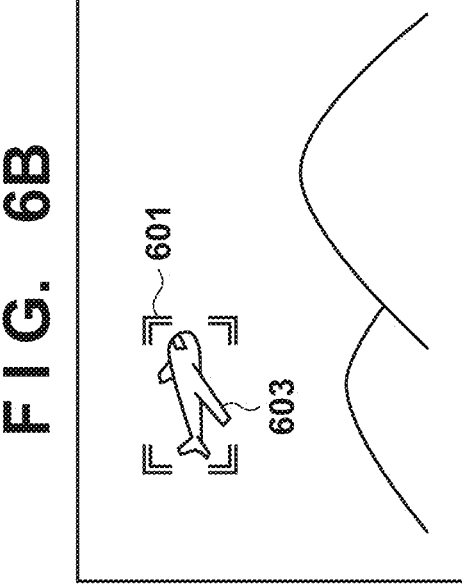

FIGS. 6A and 6B show a case where a subject is detected in step S6. In FIG. 6A, 601 represents a subject detection frame, and 602 represents a person who is a subject. This is an example of a case where a person is detected during portrait photography, etc., and is a scene in which the photographer is likely to frequently shoot a person as a subject. Further, FIG. 6B shows an example in which an airplane 603 flying over a mountain is shot as a subject, 601 represents a subject detection frame, and 603 represents an airplane as a subject. Although this is a landscape shot in the distance, the airplane 603 has been detected as a specific subject, and this is a scene where the photographer is likely to frequently and intentionally shoot the airplane 603 or the like as a subject. In this way, in a case where a subject is detected, it is determined that no adjustment processing is to be performed.

On the other hand, compared to FIG. 6B, FIG. 6C has a similar angle of view, but is a scene in which the airplane 603, which is the subject of FIG. 6B, does not exist. In such a case, since no subject is detected in step S6 and it is considered that the image is of a distant landscape, and it is determined that the adjustment processing should be performed.

Condition (2)

Next, a case will be described in which whether or not to perform the adjustment processing is determined from the AF method information. As described above, FIG. 5B shows a scene in which the arbitrary single point AF mode is set and framing is performed by the photographer with respect to the person 504, who is a subject. In this way, in a case where the arbitrary single point AF mode is set, the photographer intends to take a picture of a specific subject, so rather than keeping the entire image in focus in consideration of field curvature, it is expected that the photographer desires to focus on at an arbitrary one point. Therefore, in such a case, it is determined that adjustment processing is not to be performed.

On the other hand, in scenes such as the one shown in FIG. 6C in which a landscape is shot from a distance, it is expected that the multi-point/zone AF mode is often set as shown in FIG. 5D. Therefore, if the multi-point/zone AF mode is set, it is determined that the adjustment processing is to be performed.

Here, a method of displaying the focus adjustment state in a case where the AF method information indicates the multi-point/zone AF mode will be described using FIGS. 7A and 7B.

Similarly to FIG. 5D, FIG. 7A shows a case where the multi-point/zone AF mode is set in the AF method information when shooting a landscape. At this time, when the first shutter switch signal SW1 is detected, for example, it is conceivable to display the main frame 506 and the plurality of AF frames 505 of the defocus amounts representing the closer side on the display unit 28 in a superimposed manner as shown in FIG. 5D. On the other hand, in this embodiment, in a case of performing the adjustment processing to capture the entire image in a focused state in consideration of the field curvature, a frame 701 is displayed along the periphery of the screen of the display unit 28 as shown in FIG. 7B instead of the main frame 506 and the plurality of AF frames 505 of the defocus amounts representing the closer side in order to show that the entire screen is in focus. In this embodiment, a case has been described in which a frame is displayed at the periphery of the screen of the display unit 28, but other forms of notification methods such as not displaying a specific part of the shooting screen may be used. For example, an icon or the like indicating that the adjustment processing has been performed may be displayed.

Condition (3)

Next, a case will be described in which it is determined whether or not to perform the adjustment processing based on the AF operation information. The servo AF mode described above is an AF operation mode in which continuous shooting can be performed while keeping the subject in focus. Therefore, it is frequently used in scenes where a specific subject or the like is moving. In this case, it is determined that the adjustment processing is not to be performed in the servo AF mode so that a specific subject or the like is in focus instead of the entire shooting screen.

On the other hand, the one-shot AF mode is an AF operation mode in which the focus adjustment processing is performed once. Since the one-shot AF mode is often used when shooting landscape, and in such cases, it is considered better to perform the adjustment processing. Note that even in the servo AF mode, the first focus detection may be considered to be similar to the one-shot AF mode, and may be determined to perform the adjustment processing.

Condition (4)

Next, a case will be described in which whether or not to perform the adjustment processing is determined based on the shooting operation information. The continuous shooting mode is frequently used in scenes where a specific subject or the like is moving. Therefore, in order to perform processing so that a specific subject is in focus instead of the entire shooting screen, it is determined that the adjustment processing is not to be performed in the continuous shooting mode.

On the other hand, the single-shot mode is a shooting operation in which shooting is performed once. For immobile subjects such as landscape photography, it is assumed that single-shot mode is frequently used, and it is determined that the adjustment processing is to be performed.

Condition (5)

Next, a case will be described in which, in a case where it is determined from the subject information that a subject has been detected, whether or not to perform adjustment processing is determined based on the distance to the subject. Based on the defocus amount calculated in step S5, it is determined that the adjustment processing is to be performed in a case where the subject is far away where the influence of field curvature is noticeable. Since the field curvature increases as the distance to the subject increases, it is considered that there is no need to perform the adjustment processing in a case where the distance to the subject is short. Therefore, in this embodiment, the adjustment processing is performed if the distance to the subject is equal to or greater than a predetermined distance threshold, which is the distance at which the influence of field curvature becomes noticeable, and the adjustment processing is not to be performed if the distance is less than the distance threshold.

Note that if it is determined from the subject information that the subject is not detected, it is determined that the adjustment processing is to be performed for the same reason as the condition (1).

Condition (6)

Next, a case will be described in which, in a case where it is determined from the subject information that a subject is detected, whether or not to perform the adjustment processing is determined based on the size of the subject. Based on the size of the subject determined in step S6, it is determined that the adjustment processing is to be performed if the subject is located far away where the influence of field curvature is noticeable. Since the field curvature increases as the distance to the subject increases, it is considered that there is no need to perform the adjustment processing if the distance to the subject is short. Therefore, in this embodiment, if the size of the subject is less than a predetermined size threshold, which is the size at a distance where the influence of field curvature becomes noticeable, it is determined that the adjustment processing is to be performed, and if the size is equal to or larger than the size threshold, it is determined that the adjustment processing is not to be performed.

Note that if it is determined from the subject information that the subject is not detected, it is determined that the adjustment processing is to be performed for the same reason as condition (1).

Condition (7)

Finally, a case will be described in which whether or not to perform the adjustment processing is determined based on the depth of field.

Based on the depth of field information calculated in step S5, the adjustment processing is performed on a range outside the depth of field where the influence of field curvature is noticeable. The range of the depth of field is calculated from the F number, focal length information, and subject distance information included in the optical information of the lens 103. If the range of the calculated depth of field is narrower than a depth of field threshold that represents a range of the depth of field that includes the defocus amount due to field curvature determined by the F number and focal length information, it is considered that the effect of field curvature is not noticeable, it is determined that the adjustment processing is not necessary. In addition, if the range of the calculated depth of field is wider than the depth of field threshold that represents the range of the depth of field that includes the defocus amount due to field curvature, it is considered that the range on which field curvature influences is within the range of the depth of field and is considered to be noticeable, so it is determined that the adjustment processing is to be performed.

In the determination in step S7, if it is determined that the adjustment processing is to be performed under all of the conditions (1) to (7) described above, it is determined that the adjustment processing is to be performed, and if it is determined that the adjustment processing is not to be performed in any one of the conditions, it is determined that the adjustment processing is not to be performed.

Note that the determination method is not limited to those described above, and for example, the determination may be made based on any one condition, or the determination may be made based on a combination of some of the conditions (1) to (7). In the latter case, if it is determined that the adjustment processing is not to be performed under any one condition, it is determined that the adjustment processing is not to be performed. Alternatively, the conditions (1) to (7) can be prioritized, and it is determined whether or not to perform the adjustment processing based on the condition with the highest priority among the conditions that can be determined based on the obtained information. For example, if subject detection is turned off in the camera settings, the subject information necessary for determining the condition (1) cannot be obtained, so the conditions (2) to (7) are used to determine whether or not to perform the adjustment processing. Note that in this embodiment, the conditions (1) to (7) are placed in the order of highest priority, but the priority is not limited to this order.

Based on the above determination, if it is determined that the adjustment processing is to be performed, the process advances to step S8, and if it is determined that the adjustment processing is not to be performed, the process advances to step S11.

In the present embodiment, in a case of performing the adjustment processing, for example, in the example shown in FIG. 5, in order to perform focus adjustment using the defocus amount in the main frame 506 on the nearest side, the coordinates (x, y) of the main frame 506 are set as the image height position for calculating the adjustment amount (p) of the defocus amount. After setting the image height position in this way, the process moves to step S9.

In step S9, an adjustment amount (p) is calculated based on the image height position set in step S8. In calculating the adjustment amount (p), the adjustment amount for each coordinate is stored in advance in the nonvolatile memory 56, and the adjustment amount (p) at the image height position set in step S8 is used.

Furthermore, the adjustment amount for each coordinate stored in the nonvolatile memory 56 may be the adjustment amounts for discrete coordinates instead of the value for all coordinates. In that case, the adjustment amount (p) of the image height position may be calculated by linear interpolation, polynomial approximation, etc. based on the distance from the reference position coordinates (x0, y0) to the set image height position and the calculated value may be used.

In an interchangeable lens camera, since the adjustment amount of the lens 103, which is field curvature information, is held on the lens side, it is held in the lens system control circuit 4. In a lens-integrated camera, it is held in the nonvolatile memory 56.

Further, the method for calculating the adjustment amount (p) is not limited to the above method, and any method may be used as long as it calculates the adjustment amount (p) of the lens 103 in consideration of the influence of field curvature.

After calculating the adjustment amount (p) in step S9, the process moves to step S10.

In step S10, a corrected defocus amount (Def+p) is calculated by adding the adjustment amount (p) calculated in step S9 to the defocus amount (Def) at the main frame position calculated in step S5, and the process proceeds to step S13.

On the other hand, a process in step S11 is a process performed in a case where it is determined in step S7 that the adjustment processing is not to be performed. If the adjustment processing is not to be performed, a main frame is set at the position where a specific subject is detected in subject detection, and the process moves to step S12.

In step S12, the defocus amount (Def) in the main frame calculated in step S5 is determined as the defocus amount to be used in the focus adjustment processing, and the process proceeds to step S13.

In step S13, the movement amount of the focus lens is determined based on the defocus amount (Def+p) set in step S10 or the defocus amount (Def) set in step S12, and transmitted to the lens system control circuit 4. The lens system control circuit 4 controls the lens actuation circuit 3 using this movement amount to move the focus lens included in the lens 103, thereby adjusting the focus.

In step S14, it is determined whether or not the shutter button 61 is turned ON when the operation of the shutter button 61 is completed, so-called full pressing (shooting instruction), and the second shutter switch signal SW2 is detected. If the second shutter switch signal SW2 is detected, the process moves to step S15 to acquire a shot image. If the second shutter switch signal SW2 is not detected, the process proceeds to step S16 in order to determine whether or not to continue a series of shooting processes including the focus detection processing, focus adjustment processing, and shooting processing without obtaining a shot image.

In step S15, in order to obtain a shot image, a shooting processing is performed and obtains a shot image. The shot image is saved to the recording medium 200. After saving the shot image, the process moves to step S16.

In step S16, it is determined whether or not the photographer has given an instruction to continue shooting. If there is an instruction to continue shooting, the process moves to step S4 and a series of shooting processes from steps S4 to S16 are executed. If there is no instruction to continue shooting, the series of shooting processes from steps S4 to S14 is ended.

Note that the continuous focus adjustment mode and continuous shooting mode, which are related to the second shutter switch signal SW2, are used for determination of the continuous shooting instruction.

As described above, according to the present embodiment, it is possible to change whether or not to perform the adjustment processing for shooting with the entire image being in a focused state in consideration of field curvature. Note that in this embodiment, the adjustment amount is added to the defocus amount for correction, but the correction may be performed by calculating the difference in spatial frequency between the center and the periphery of the image data after shooting and performing refocus processing. Alternatively, bracket shooting may be performed at the time of shooting based on the field curvature information of the imaging optical system, and then the user may select an image from among the shot images.

OTHER EMBODIMENTS

Note that the present invention may be applied to a system made up of a plurality of devices, or to a device made up of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-129512, filed Aug. 8, 2023, which is hereby incorporated by reference herein in its entirety.

What is claimed is:

1. A focus adjustment apparatus comprising one or more processors and/or circuitry which function as:

a focus detection unit that detects a focus state in one or more areas based on image data obtained from an image shooting unit;

a subject detection unit that detects a subject from an image of the image data and outputs subject information;

a determination unit that determines whether or not one or more predetermined conditions are satisfied based on at least one of shooting setting information set by a user and the subject information, and determines whether or not to perform adjustment processing for correcting an effect of field curvature on the focus state;

an adjustment unit that adjusts the focus state detected by the focus detection unit in a case where the determination unit determines that the adjustment processing is to be performed; and a calculation unit that calculates a movement amount of a focus lens based on the focus state adjusted by the adjustment unit, or on the focus state detected by the focus detection unit in a case where the focus state is not adjusted by the adjustment unit, wherein the shooting setting information includes at least one of:

information indicating whether a first mode in which the user selects an area where the focus state is to be detected or a second mode in which the user does not select an area where the focus state is to be detected is set, information indicating whether a third mode in which a subject is kept in focus or a fourth mode in which a process to detect the focus state is performed once is set, information indicating whether a single shooting mode or a continuous shooting mode is set, and information on depth of field, and wherein the subject information includes at least either of:

information indicating whether a subject is detected, and in a case where the subject is detected, at least one of a distance to the subject and a size of the subject in the image.

2. The focus adjustment apparatus according to claim 1, wherein the one or more predetermined conditions include a plurality of conditions, and wherein the determination unit determines whether or not all of the plurality of conditions are satisfied, and if it is determined that all of the plurality of conditions are satisfied, determines to perform the adjustment processing.

3. The focus adjustment apparatus according to claim 1, wherein the one or more predetermined conditions include a plurality of conditions with priority, and the determination unit determines whether the conditions are satisfied in the order of priority from the highest to the lowest among the plurality of conditions, and if it is determined that if any of the conditions is satisfied, determines to perform the adjustment processing.

4. The focus adjustment apparatus according to claim 1, wherein the one or more predetermined conditions include a condition in which the second mode is set.

5. The focus adjustment apparatus according to claim 1, wherein the one or more predetermined conditions include a condition in which the fourth mode is set.

6. The focus adjustment apparatus according to claim 1, wherein the one or more predetermined conditions include a condition in which the single shooting mode is set.

7. The focus adjustment apparatus according to claim 1, wherein the one or more predetermined conditions include a condition in which a range of the depth of field is equal to or greater than a predetermined threshold.

8. The focus adjustment apparatus according to claim 1, wherein the one or more predetermined conditions include a condition in which a subject is not detected.

9. The focus adjustment apparatus according to claim 1, wherein the one or more predetermined conditions include a condition in which a subject is detected and a distance to the subject is equal to or greater than a predetermined threshold.

10. The focus adjustment apparatus according to claim 1, wherein the one or more predetermined conditions include a condition in which a subject is detected and a size of the subject in the image is less than a predetermined threshold.

11. The focus adjustment apparatus according to claim 1, wherein the one or more processors and/or circuitry which function further functions as a display control unit that displays the image data on a display unit and superimposes on the display unit a notification indicating that focus adjustment is being performed based on the image data, and wherein the display control unit displays the notification in a first form in a case where the calculation unit calculates the movement amount based on the focus state adjusted by the adjustment unit, and displays the notification in a second form in a case where the calculation unit calculates the movement amount based on the focus state detected by the focus detection unit.

12. An electronic device comprising:

an image shooting unit; and a focus adjustment apparatus comprising one or more processors and/or circuitry which function as:

a focus detection unit that detects a focus state in one or more areas based on image data obtained from an image shooting unit;

a subject detection unit that detects a subject from an image of the image data and outputs subject information;

a determination unit that determines whether or not one or more predetermined conditions are satisfied based on at least one of shooting setting information set by a user and the subject information, and determines whether or not to perform adjustment processing for correcting an effect of field curvature on the focus state;

an adjustment unit that adjusts the focus state detected by the focus detection unit in a case where the determination unit determines that the adjustment processing is to be performed; and a calculation unit that calculates a movement amount of a focus lens based on the focus state adjusted by the adjustment unit, or on the focus state detected by the focus detection unit in a case where the focus state is not adjusted by the adjustment unit, wherein the shooting setting information includes at least one of:

information indicating whether a first mode in which the user selects an area where the focus state is to be detected or a second mode in which the user does not select an area where the focus state is to be detected is set, information indicating whether a third mode in which a subject is kept in focus or a fourth mode in which a process to detect the focus state is performed once is set, information indicating whether a single shooting mode or a continuous shooting mode is set, and information on depth of field, and wherein the subject information includes at least either of:

information indicating whether a subject is detected, and in a case where the subject is detected, at least one of a distance to the subject and a size of the subject in the image.

13. A focus adjustment method comprising:

detecting a focus state in one or more areas based on image data obtained from an image shooting unit;

detecting a subject from an image of the image data and outputting subject information;

determining whether or not one or more predetermined conditions are satisfied based on at least one of shooting setting information set by a user and the subject information, and determining whether or not to perform adjustment processing for correcting an effect of field curvature on the focus state;

adjusting the detected focus state in a case where it is determined that the adjustment processing is to be performed; and calculating a movement amount of a focus lens based on the adjusted focus state, or on the detected focus state in a case where the focus state is not adjusted, wherein the shooting setting information includes at least one of:

information indicating whether a first mode in which the user selects an area where the focus state is to be detected or a second mode in which the user does not select an area where the focus state is to be detected is set, information indicating whether a third mode in which a subject is kept in focus or a fourth mode in which a process to detect the focus state is performed once is set, information indicating whether a single shooting mode or a continuous shooting mode is set, and information on depth of field, and wherein the subject information includes at least either of:

information indicating whether a subject is detected, and in a case where the subject is detected, at least one of a distance to the subject and a size of the subject in the image.

14. A non-transitory computer-readable storage medium, the storage medium storing a program that is executable by the computer, wherein the program includes program code for causing the computer to function as an focus adjustment apparatus comprising:

a focus detection unit that detects a focus state in one or more areas based on image data obtained from an image shooting unit;

a subject detection unit that detects a subject from an image of the image data and outputs subject information;

a determination unit that determines whether or not one or more predetermined conditions are satisfied based on at least one of shooting setting information set by a user and the subject information, and determines whether or not to perform adjustment processing for correcting an effect of field curvature on the focus state;

an adjustment unit that adjusts the focus state detected by the focus detection unit in a case where the determination unit determines that the adjustment processing is to be performed; and a calculation unit that calculates a movement amount of a focus lens based on the focus state adjusted by the adjustment unit, or on the focus state detected by the focus detection unit in a case where the focus state is not adjusted by the adjustment unit, wherein the shooting setting information includes at least one of:

information indicating whether a first mode in which the user selects an area where the focus state is to be detected or a second mode in which the user does not select an area where the focus state is to be detected is set, information indicating whether a third mode in which a subject is kept in focus or a fourth mode in which a process to detect the focus state is performed once is set, information indicating whether a single shooting mode or a continuous shooting mode is set, and information on depth of field, and wherein the subject information includes at least either of:

information indicating whether a subject is detected, and in a case where the subject is detected, at least one of a distance to the subject and a size of the subject in the image.

* * * * *